C. M. SYMONDS.
CONTAINING CAN.
APPLICATION FILED JAN. 22, 1913.
Reissued Apr. 11, 1916.
14,109.
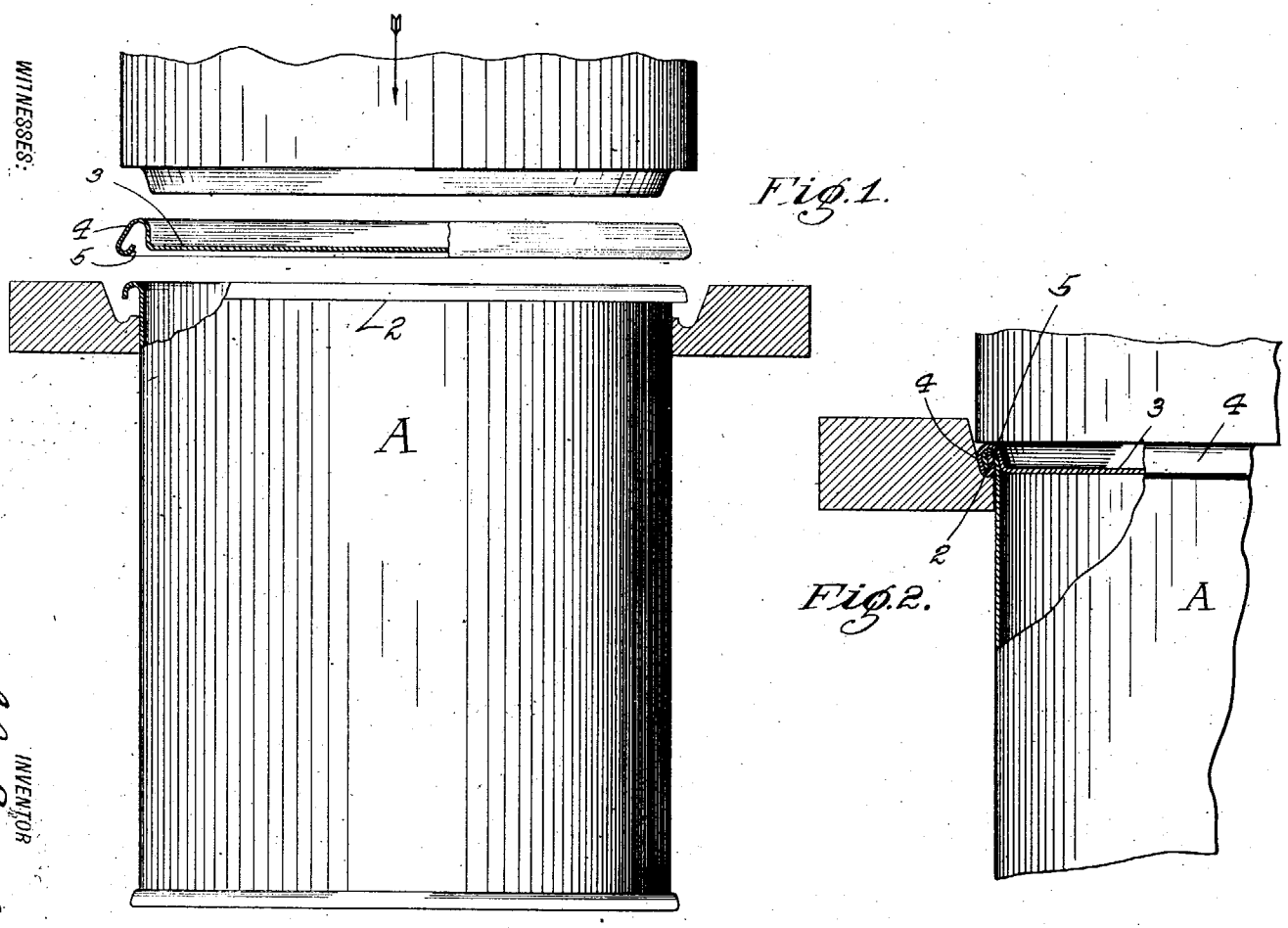
WITNESSES:
H. A. Stock
Harry H. Potter
INVENTOR
C. M. Symonds
BY D. Allen
ATTORNEY

UNITED STATES PATENT OFFICE.

CLARENCE M. SYMONDS, OF SAN ANSELMO, CALIFORNIA, ASSIGNOR TO AMERICAN CAN COMPANY, OF NEW YORK, N. Y., A CORPORATION OF NEW JERSEY.

CONTAINING-CAN.

14,109. Specification of Reissued Letters Patent. Reissued Apr. 11, 1916.

Original No. 934,370, dated September 14, 1909, Serial No. 455,777. Application for reissue filed January 22, 1913. Serial No. 743,882.

*To all whom it may concern:*

Be it known that I, CLARENCE M. SYMONDS, citizen of the United States, residing at San Anselmo, in the county of Marin and State of California, have invented new and useful Improvements in Containing-Cans, of which the following is a specification.

My invention relates to improvements in containing cans and especially that class which is designed to contain hermetically sealed goods of any description, and which are known as "sanitary" cans; such cans being sealed without the use of solder, or other substance which may have deleterious effect upon the contained fruit.

It consists in a means for closing and hermetically sealing the can after the contents of the can have been properly put or processed, and in readiness for the sealing.

Referring to the accompanying drawings for a more complete explanation of my invention—Figure 1 is a side elevation, partly in section, of the can and top before assembling. Fig. 2 is an enlarged section of the seamed top and can.

The ordinary method for preparing hermetically sealed goods for the market is to fill the cans, pass them through what is known as the "exhaust box", in which they are heated so as to drive out any air that may be contained in the cans, then place the tops on the cans and pass them through the closing machine. In thus passing the open can through the exhaust box, the contents swell more or less by reason of the heat, and project above the top of the can, so that this projecting portion being above the surface of the liquid with which the can is filled, becomes scalded, which is a serious objection, especially in high grade fruit, and in the forcing of the top or cover on in the closing machine, the fruit is more or less crushed and bruised, and portions get between the flange of the can and the cover, and prevent a perfectly air-tight joint being made.

In this invention the cans and covers are made with a peculiar interlocking flange so that the cover may be snapped on over the flange of the can body, after the can has been filled, and before it goes into the exhaust box and the cover, while being prevented from coming off, leaves space enough to allow the proper exhaust or discharge of vapor, and at the same time prevents the contents from being scalded or bruised, and from getting between the flange of the can and the body. It also avoids the handling of the cans while they are hot.

The cans which are formed in large quantities in the can factories and are shipped to various points where they are to be used, ordinarily have a substantially radially projecting flange with which the cover, also properly flanged, will be "double-seamed" as it is called, when the two are put together. These projecting edges of the can are easily damaged in the process of shipment and handling, and when so damaged, there is great loss, because the heads will not close properly with them.

In my invention, the upper edge of the can A is turned over to form a rim 2, the outer edge of which is turned downwardly, as shown, and this down-turned edge forms a resistant shape which will prevent its being damaged by rough usage.

The cover 3 is formed with an arched, annular rim 4 which is turned downwardly, thence bent inwardly and upwardly as shown at 5. This inturned edge 5 is of such diameter that the cover can, by a little pressure, be caused to snap over the outwardly turned edge 2 of the can body, and thus lock the parts together so that it will not be possible to again remove the cover, but the engagement is a loose one which allows any steam or vapor from the contents of the can to escape when the can is placed in the exhaust box after being filled. The contents of the can are also prevented from swelling and rising above the liquid in which it is contained, and thus scalding is prevented. The contents are also prevented from extending over the edges of the can as the cover is already in place, and after the filling and exhausting have been completed, the seam is formed by dies which are not here described, instead of using rollers by which the usual double seams of ordinary cans are formed. The closure may thus be completed without any handling of the cans while hot, as they can be delivered automatically and directly from the exhaust-box to the closing dies, and all the objectionable features heretofore mentioned, are avoided.

The invention may be applied to oval.

square or irregular cans as well as to round ones.

The method disclosed in the foregoing specification is not claimed herein, the same being the subject of my reissue application Serial No. 55,071, filed Aug. 9, 1915, which is a division hereof.

Having thus described my invention, what I claim and desire to secure by Letters Patent is—

1. In a containing can of the character described, an outwardly and downwardly turned annular rim formed around the top of the can, and a cover having a downwardly and inwardly turned peripheral edge adapted to snap into engagement and loosely interlock with the can flange to retain the cover in position.

2. As an article of manufacture, a can having an outwardly and downwardly turned flange around the top, a cover having a corresponding flange exterior to the flange of the top, said cover flange having an inwardly and upwardly turned extension, and said flanges adapted to slip one past the other and to snap into engagement when compressed, to form a hermetically sealed closing joint.

3. In a can for use in the art of canning food products wherein a filled container is passed through an exhaust apparatus and subsequently has a cover hermetically sealed to the open top end thereof, the combination with a filled container the open top end of which is outwardly flanged circumferentially, of an inwardly flanged can cover loosely applied and positively held to the open flanged end of the container and providing a vent outlet for generated gases within the can.

4. In a can for use in the art of canning food products wherein a filled container is passed through an exhaust apparatus and subsequently has a can cover sealed to the open end thereof, the combination with a filled open end container, of a can cover, and means for loosely uniting and positively holding the said cover to the open end of the container which means provide a vent outlet for generated gases within the can.

5. In a container for food products, the combination with a body part having an open circumferential flanged top end, of a cover shaped to fit the body part and to be sealed by a lap seam joint thereto, said cover having a loose securing engagement with the flange of the body part whereby the cover is positively locked against displacement, and a gas escaping joint is formed between the engaging parts.

6. In a filled container for the described purpose, the combination with the circumferential flanged top end thereof, of a correspondingly flanged end cover for closing and hermetically sealing the same, and means for loosely interlocking said flanges whereby the cover is held against interior pressure and a gas vent is formed between the cover and the container.

7. In a can for use in the art of canning food products wherein an open ended filled container is passed through an exhaust apparatus prior to having its end cover hermetically sealed thereto, the combination with a filled open end container, of an end cover therefor, and means for loosely locking the said cover to the open end of the filled container to hold the cover against outward pressure of the solid contents and provide a vent outlet for generated gases within the can.

8. In a containing can of the character described, an outwardly and downwardly turned annular rim formed around the top of the can, and a cover having a downwardly and inwardly turned peripheral edge adapted to loosely interlock with the can flange so as to provide a gas vent and retain the cover in position against the pressure of the other contents of the can.

9. A containing can for the described purpose provided at its top with an outwardly turned annular rim, and a can cover provided with a circumferential flange united to the rim of the can by an inturn of its peripheral edge to retain the cover securely and permanently in position relative to the can and provide an outlet for gases generated within the said can.

In testimony whereof I have signed my name to this specification in the presence of two subscribing witnesses.

CLARENCE M. SYMONDS.

Witnesses:
N. A. Acker,
D. B. Richards.